Jan. 27, 1953     O. M. BURKHARDT     2,626,726
COOKING UTENSIL
Filed April 5, 1945
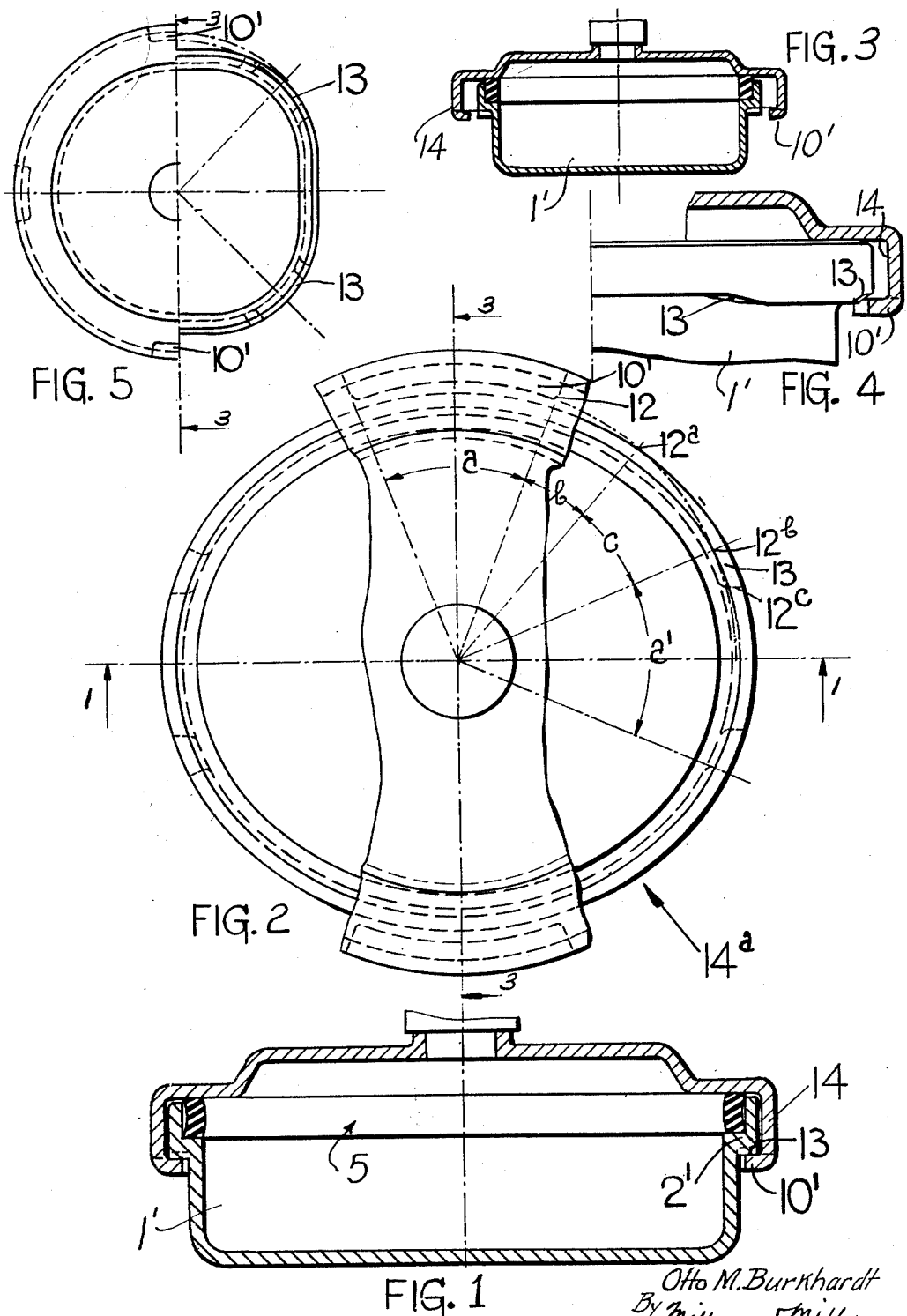

Patented Jan. 27, 1953

2,626,726

UNITED STATES PATENT OFFICE 2,626,726

COOKING UTENSIL

Otto M. Burkhardt, Euclid, Ohio

Application April 5, 1945, Serial No. 586,734

1 Claim. (Cl. 220—40)

This invention relates to the art of cooking utensils and is related to that disclosed in my co-pending application Serial No. 530,547, filed April 11, 1944, now matured into Patent No. 2,524,558.

It is one object of my present invention to provide a cooking utensil in which the container itself is free of the abrupt projections that are commonly found thereupon and that seem to be regarded quite generally as being necessary for sealing purposes. My object is to devise such a container whose surface is free of objectionable projections that interfere with its utility, as for instance in handling and cleaning the same, and that detract from its appearance.

Another object of my present invention is to design a pressure cooker in which the container itself is of sufficiently attractive appearance to suitably adapt it for use in the actual serving of the food that has been prepared therein. For this purpose also it must be free from such interruptions in its surface as are commonly found upon the containers of pressure cookers.

Another object is to design a pressure cooker in which containers of different sizes may be of different depths but all of the same diameter, the idea being to adopt a diameter that is best suited for this purpose. In this way, one cover will fit all containers regardless of capacity. This object contemplates also the adoption of a container of standard diameter so as to facilitate its use upon a standard size of heating unit in a range, whereby there may be obtained the maximum heating efficiency in all cases. Another part of this same object is to standardize the manufacture of the containers and the covers therefor so that the covers, which may be made by specialists in that field, will correctly fit the containers which may be manufactured elsewhere.

Another object is to devise a cooker in which there is reduced to a minimum the danger of the cover being loosened while pressure exists within the container; and in which, when the cover has been unlocked either purposely or inadvertently, there is ensured a release of the internal pressure while the cover is still held onto the container, thereby avoiding the danger of the cover being blown off by such pressure.

Another object is to devise a new and improved process of cooking food, which is made possible by my floating arrangement of the cover upon the sealing gasket, as will appear from the following; the idea being to ensure a hermetic sealing effect even if the pressure within the container drops below that of the outside atmosphere. This object contemplates also the provision of means whereby the food within the container may be preserved if, for some reason, it is not eaten immediately following the completion of the cooking operation.

Another object, as in the above-mentioned application now patented, is to provide means whereby internal pressure will cause the cover to be deflected upwardly between its points of anchorage, with the corresponding restitution of the gasket to a predetermined extent from its deformed condition that was caused by the locking engagement of the cover thereupon. More specifically, this object contemplates the designing of these parts in such manner that, at a predetermined point of internal pressure, the gasket will have been restored to its normal or distended condition and hence can not follow the upward deflection of the edge portion of the cover any farther; whereupon there will occur a leakage or relief of the internal pressure out between the gasket and the edge of the cover in the nature of a safety valve.

Other objects will appear from the following description and claims when considered together with the accompanying drawings.

Fig. 1 is a vertical sectional view of my present invention;

Fig. 2 is a top plan view thereof, with part of the cover broken away and illustrating the manner of applying the cover;

Fig. 3 is a vertical sectional view illustrating the initial position of the cover as it is first applied to the container;

Fig. 4 is a partial view illustrating the next position of the cover as it is turned towards fully locked position that is shown in Fig. 1, the cover being shown in section and the container in elevation, the position of the cover in this view corresponding to the direction of arrow 14a in Fig. 2; and Fig. 5 is a top plan view, with part of the cover broken away, illustrating a modified embodiment of the same form of invention as is shown in Figs. 1 to 4.

It is to be understood that the present form of disclosure is merely for the purpose of illustration and that there might be devised various modifications thereof without departing from the spirit of my invention as herein set forth and claimed.

Referring now to the accompanying drawing in detail, the container 1' which may be stamped, spun or cast out of aluminum or any other suitable material, has its top edge portion turned outwardly so as to form a shoulder 2' to accommodate the lower face of the rubber sealing gasket 5 and thence upwardly. The gasket 5 extends upwardly beyond the top edge of the upwardly extending portion of the container so as to provide a floating sealing engagement for the closure which rests thereupon and which has a depending marginal flange 14 and inwardly extending lugs 10' for locking engagement beneath the shoulder 2'. Engagement of the closure upon the gasket will cause the same to be bowed inwardly and vapor pressure within the utensil will impress itself upon the inner wall of the bowed gasket and will thus tend to effect restitution of the gasket; with the result that the sealing engagement of the gasket with the cover and container becomes even more effective under such pressure. Since, with increasing working pressure within the cooking utensil, there is a proportional tendency for the closure to be deflected upwardly as well as for the deformed gasket to be straightened, it follows that internal pressure beyond a predetermined point will cause a still further upward deflection and eventual separation of the closure from the then fully distended gasket, with the result that there will be permitted a leakage of the internal pressure out between the closure and the top surface of the gasket. This feature constitutes a further safety measure that is very similar to that set forth in my co-pending application mentioned above, now patented.

However, if and when the heat supply becomes less than the dissemination of heat by the cooking utensil or is shut off entirely, then the internal pressure diminishes; and in time the internal pressure will drop below that of the atmosphere, with the result that the relatively greater outside air pressure will press the closure down upon the gasket 5 and still ensure effective sealing of the closure. Hence the gasket in this combination is double-acting in its sealing effect. That is to say, the pressure within the cooking utensil will tend to effect restitution of the deflected gasket for more effective sealing engagement with the closure; and, as a result of sub-atmospheric pressure within the cooking utensil, and because of the floating arrangement of the closure, the latter will still be effectively engaged upon the gasket.

In the top of the closure there will be provided a combination valve substantially the same as that disclosed in the above-mentioned companion application, to which reference may be had for a fuller understanding of this feature.

It will be noted that the upper part of the container to which the closure is attached, is made of out-of-round shape. In Fig. 2 the out-of-round upper part of the container 1 is shown as having its major axis extending horizontally while that axis of the closure, upon which are located the ledges 10' for locking engagement with the container, extends at right angles thereto. The difference between the major axis and the minor axis of the container is here purposely exaggerated for the purpose of illustration. For the purpose of still better illustration, only that part of the closure on which ledges 10' are located is here shown superimposed upon the container. The out-of-round form is here illustrated as being confined to the top part of the container.

The container of Figs. 1 and 2 has a ledge 2' serving as an abutment for the fastening means; and the closure in Fig. 1 has corresponding ledges 10' extending over an angle $a$ of the circumference at diametrically opposite extremes of an axis through the closure. With this axis of the closure coinciding with the minor axis of the container, it will be noted that the ledges 10' of the closure amply clear the outer edge of the container so that the closure can be easily removed from or replaced upon the container. When the closure is turned clock-wise through the angle $b$ about its center, then as indicated by the dot-dash line, the extreme point 12 of the closure ledge begins to pass at 12a under the ledge 2' of the container. Upon further turning of the closure in the same direction through the angle $c$, the closure although still loose upon the container, can not be removed by internal pressure along the longitudinal axis of the container. The cover is loose upon the container and pressure can escape from the container but this internal pressure can not blow the cover away from the container and cause an accident as would otherwise be possible.

The under-side of each ledge 2' of the container is provided with a ramp 13 extending between points 12b and 12c. When point 12 of the closure ledge 10' is turned farther past point 12b, it is forced to climb the ramp 13 and then the closure is pulled downward upon the gasket 5 in the container and an effective seal is obtained. Handles, not shown, may be provided for such turning if so desired. The closure is here shown to be round form so that the exterior of the closed cooking utensil offers a continuously smooth and pleasing appearance.

If inadvertently the closure is turned when there is pressure in the cooking utensil, then when the ledge 10' is turned beyond the ramp 13, the closure becomes loose and the internal pressure is suddenly released. But, as previously stated, the closure is still held upon the container; and the rim 14, which runs all around the closure, deflects any escaping substance downwardly and away from where it could cause an accident.

It will be noted that the ledges 2' of the container are provided with the ramp 13 which provides the tightening means for the closure engagement.

Fig. 5 shows that the top part of the container is not restricted to the particular shape shown in the preceding figures of the present drawing but can be of anyone of various out-of-round forms. Fig. 5 for instance indicates the provision of four ledges 10' and four ramps 13. The main object is to have one or more diameters of the container smaller than an equal number of others so that the larger diameter of the closure, being provided with diametrically opposite ledges, may be freely placed upon the container or removed therefrom when the axis of these ledges on the closure coincides with the smaller axis of the container in any given case.

As will be seen from Figs. 1 to 5, the closure may be manipulated in either clockwise or counter-clockwise direction for effecting operation of the closure-engaging means above described.

The closure may be applied or removed laterally but it will be more convenient to apply the closure first in the direction of the axis of the container and to remove the same in the reverse manner. By turning the closure, after so applying it to the container, a partial anchorage between the closure and container is secured and this ensures against accidental removal of the closure from the container. Then, by following the reverse order of procedure in removing the closure, the pressure is released while the closure is still anchored to the container and thus any discharge from the container under pressure is deflected by the rim 14 so that it can not cause an accident. Thus the internal pressure can force the unlocked closure upwardly only a limited or controlled distance and consequently there is no danger of the closure being accidentally blown off of the container by the force of pressure within the cooking utensil at any time, as might otherwise happen. The present arrangement constitutes a means of increasing the factor of safety which is of prime importance in cooking utensils, as will be readily understood by those who are familiar with the art to which this invention relates.

The operation of the present forms of device is substantially the same as that of the device disclosed in my Patent No. 2,524,558, supra, and therefore it will be referred to here only briefly. When the food has been placed within the container with whatever liquid is required, the closure will be applied to and locked upon the container; and the pressure selector cock (not fully shown) will be set at "Vent." Then, after sufficient heat has been applied to bring the food to the boiling point, the escape of steam from the boiling liquid within the container will cause the whistle of the safety cock to give an audible signal. The cock may then be set for the pressure desired and the cooking continued until the vapor pressure within the cooking utensil raises the valve and produces the second audible signal, at which time the application of heat to the container may either be discontinued or regulated to merely balance the loss of heat. The degree of internal pressure will of course vary with different foods in order to obtain the most desirable results in all instances. For example, comparatively low pressure will suffice for the more tender vegetables while greater pressure will be required for the proper cooking of potatoes and meat. Another factor to be taken into consideration, of course, is the length of time of the cooking operation.

In this connection I have discovered and devised a new process of cooking foods, with a consequent improvement in the resulting condition of the food and a decided saving of either time or fuel for the cooking operation; and my cooker is especially well adapted for carrying out this new process.

According to the old process which has been universally practiced with the open container, with or without a loose cover, the food is raised to a boiling point and is then held at such temperature for a decided period of time by continuing the application of heat to the container within which the food is enclosed. Obviously this old process requires a considerable length of time especially for foods of certain kinds, as meat and potatoes; much of the vapor escapes from the cooking utensil; and also a large part of the most desirable flavoring component of the food is lost by chemical changes, either escaping with the vapor or remaining with the liquor which is usually discarded.

Now, according to my new process, the temperature of the food in the container will be raised to temperature substantially higher than the boiling point of the liquid in which the food is being prepared, whereupon the application of heat to the container is discontinued entirely and the food is permitted to remain within the sealed container so as to complete the cooking operation by utilizing the residual heat within the food and the cooking utensil. In the case of meat, for instance, where more heat is required than that which has been stored up within the cooking utensil, the utensil may at this point be transferred to a heat-insulated well or to a thermocontainer so as to conserve the remaining heat within the utensil while completing the cooking operation.

Briefly, my new process means the production of a substantially higher temperature than the boiling point of the liquid within the container, as above explained, and then the utilization of the residual heat within the food and the cooking utensil for the purpose of completing the cooking operation after removal of the container from the source of heat. This means not only a saving in time and fuel but also the preservation of the most desirable qualities of the food being cooked.

This new process is made possible by my new floating arrangement of the closure upon the sealing gasket, as above explained. Such arrangement of the closure permits the cooking operation to be continued even during the time when the pressure within the cooking utensil falls to a point below that of the outside atmosphere. That is to say, the reduction of vapor pressure within the cooking utensil after its removal from the source of heat would, except for my floating arrangement of the closure, permit entrance of outside air into the container and consequent reduction of internal temperature and discontinuance of the cooking operation and at least partial deterioration of the food. However, the comparatively greater outside pressure upon the closure will serve to preserve the completely sealed condition of the closure upon the container and consequently there will be no interruption of the cooking operation within the cooking utensil even at the reduced temperature and there will be no deterioration of the food.

For instance, supposing that the internal pressure has been raised to a maximum of 250 degrees Fahrenheit and that the container is then removed from the source of heat; and let us suppose that, after a time, the temperature within the cooking utensil has fallen to 190 degrees Fahrenheit, with accompanying condensation of vapor and reduction of pressure within the utensil. Even under these conditions the cooking operation will continue because of the partial vacuum which has been created within the container and is being preserved therewithin by the continuance of the sealed condition of the closure by virtue of the floating arrangement of the same upon the sealing gasket, as above explained. It is of course well known that reduced pressure reduces the boiling point of a given liquid.

More specifically, the cooking of one pound of potatoes in an open container may require 1,000 B. t. u.'s in order to bring them to the boiling point and thereafter 100 B. t. u.'s per minute for twenty-five minutes. Thus a total of 3,500 B. t. u.'s would be required for the complete process. With the conventional pressure cooker, 1,500 B. t. u.'s are stored within the potatoes, at the same time raising the pressure within the container to thirty pounds absolute and the temperature therein to 250 degrees Fahrenheit. Thereafter 100 B. t. u.'s per minute for ten minutes would be required to completely process the potatoes, or a total of 2,500 B. t. u.'s for the entire process.

Now, according to my new process and with my present improved vapor cooker, a house-wife may raise the temperature to 250 degrees Fahrenheit and thirty pounds absolute pressure within the container and then discontinue to supply heat; and fifteen minutes later she will have fully processed potatoes, the final condition within the cooking utensil being about ten pounds absolute pressure and 193 degrees Fahrenheit.

My present device makes it possible to practice a process of cooking which is not possible even with the other pressure cookers, so far as I am aware; and, as a result, I am able to reduce the actual cooking time and to accomplish a saving in fuel required in any given case, as well as to obtain much improved results with respect to the quality of the food after it has been cooked.

My vacuum has the further advantage that in case, during the cooking of the food, it should become necessary to delay the serving of the same, the house-wife may avoid having the food spoiled because of such delay as it may be preserved by my vacuum process. Thus under such circumstances my process proves a means of saving the food in perfectly good condition and without any detriment whatever.

With my vacuum cooking process it is not only possible to save time by bringing the temperature of the liquid within the container above its boiling point, as above explained, but my floating arrangement of the cover upon the sealing gasket permits completion of the cooking operation under vacuum within the cooking utensil, thereby conserving fuel as well as the desirable qualities of the food that is being cooked.

Thus the floating arrangement of the cover upon the sealing gasket is essential to the performance of my new process of cooking and it also makes possible the preservation of the food after it has been cooked in my utensil and until it is desired to serve the same.

My present invention is especially useful in connection with picnics; for, as above explained, the cooker may be placed in a heat-insulated container and the food may be served at any time desired without any loss of its good qualities.

According to my present invention, the container itself is free of any abruptly protruding locking means and may, as a result, be employed for various purposes; also, the smooth form of the container makes it easier to clean and presents a more attractive appearance. Furthermore, this feature facilitates the manufacture, handling, storing and shipping of these containers and also promotes the sale of the same; and the smooth inner surface of the mouth portion of the container facilitates pouring therefrom or emptying the contents thereof. The arrangement of the locking means, as herein set forth, prevents the closure from being blown off accidentally by pressure within the cooking utensil; and there is also afforded a means of indicating when it is safe to remove the closure from the container. Another marked advantage resides in my new process of cooking and preserving food in vapor at any pressure, which is made possible with my new form of cooking utensil. Finally, these and other advantages which will suggest themselves to those who are familiar with the art of cooking utensils, may be embodied in a cooker and sold at a very reasonable price because of the comparatively simple construction of my present invention.

What I claim is:

A cooking utensil comprising a container member with an opening, a closure member therefor having a depending annular skirt entirely surrounding the open end of said container, an annular flexible sealing means the material of which is of greater height than width in radial cross section arranged between said container and closure members and enclosed entirely within said closure member, said height of the sealing means in normal free condition being greater than the distance between the container and closure at the top and bottom of said sealing means when said container and closure are in locked engagement, the sealing means being flexed inwardly by the locking engagement of said closure and container members and having its inner surface exposed to pressure radially outward within the utensil and responsive thereto for promoting sealing engagement between said container and closure members, and rotatively interengageable means between the outside of said container member and the inner side of said skirt of said closure member, said interengageable means including a plurality of separate parallel horizontal surfaces that are substantially spaced from each other in a direction corresponding to the longitudinal axis of the utensil and that are formed as a unitary part of one of said members, and projecting means upon the other of said members for co-operative engagement with said surfaces for compressing and flexing said sealing means so as to hold said closure member in sealed condition for all internal pressures and to hold said closure member in unsealed condition for venting the internal pressure, respectively, said horizontal surfaces extending for the greater part and constituting the primary part of said interengageable means so as to afford interengageable surfaces of substantial extent for dependable engagement.

OTTO M. BURKHARDT.

REFERENCES CITED

The following references are of record in the file of this patent:

UNITED STATES PATENTS

| Number | Name | Date |
|---|---|---|
| 876,822 | Maxwell | Jan. 14, 1908 |
| 1,786,507 | Reichart | Dec. 30, 1930 |
| 2,164,450 | Eshbaugh et al. | July 4, 1939 |
| 2,177,123 | Wittenberg | Oct. 24, 1939 |
| 2,201,314 | Illsley | May 21, 1940 |
| 2,248,885 | McClaskey | July 8, 1941 |
| 2,376,593 | Hellen | May 22, 1945 |
| 2,378,950 | Reich | June 26, 1945 |

FOREIGN PATENTS

| Number | Country | Date |
|---|---|---|
| 193,888 | Switzerland | Mar. 1, 1938 |
| 677,739 | France | Dec. 18, 1929 |